(12) United States Patent
Lee et al.

(10) Patent No.: US 11,679,880 B2
(45) Date of Patent: Jun. 20, 2023

(54) SEATING ARRANGEMENTS FOR A VEHICLE CABIN

(71) Applicant: Adient Aerospace, LLC, Bothell, WA (US)

(72) Inventors: Sahng Seok Lee, Bothell, WA (US); Zhao Jin, Kirkland, WA (US)

(73) Assignee: ADIENT AEROSPACE, LLC, Bothell, WA (US)

( * ) Notice: Subject to any disclaimer, the term of this patent is extended or adjusted under 35 U.S.C. 154(b) by 63 days.

(21) Appl. No.: 17/127,957

(22) Filed: Dec. 18, 2020

(65) Prior Publication Data

US 2021/0188442 A1 Jun. 24, 2021

Related U.S. Application Data

(60) Provisional application No. 62/949,820, filed on Dec. 18, 2019.

(51) Int. Cl.
*B64D 11/06* (2006.01)

(52) U.S. Cl.
CPC ...... *B64D 11/0601* (2014.12); *B64D 11/0606* (2014.12)

(58) Field of Classification Search
CPC .............. B64D 11/0601; B64D 11/064; B64D 11/0606; B64D 11/0641; B60N 2/34; B63B 2029/043
See application file for complete search history.

(56) References Cited

U.S. PATENT DOCUMENTS

| | | | | |
|---|---|---|---|---|
| 8,245,970 B2* | 8/2012 | Harcup | ............... | B64D 11/0604 244/118.6 |
| 8,348,195 B2* | 1/2013 | Ersan | ................. | B64D 11/0601 244/118.6 |
| 8,944,379 B2* | 2/2015 | Orson | ................ | B64D 11/0642 244/118.6 |
| 8,998,138 B2* | 4/2015 | Ferry | ................. | B64D 11/0643 244/118.6 |
| 8,998,139 B2* | 4/2015 | Dryburgh | ............... | B64D 11/06 244/118.6 |
| 10,144,513 B2* | 12/2018 | Foucher | ............. | B64D 11/0606 |
| 10,773,804 B2* | 9/2020 | Valdes De La Garza | .................... | B64D 11/0643 |
| 2010/0038484 A1* | 2/2010 | Ersan | ..................... | B64D 11/06 244/118.6 |

(Continued)

FOREIGN PATENT DOCUMENTS

DE 102006056898 A1 * 6/2008 ............... B60N 2/01
DE 102006056898 A1 6/2008

(Continued)

OTHER PUBLICATIONS

EP 20215676.6—Extended European Search Report, dated Apr. 30, 2021, 8 pages.

*Primary Examiner* — Joshua J Michener
*Assistant Examiner* — Arfan Y. Sinaki
(74) *Attorney, Agent, or Firm* — Jordan IP Law, LLC

(57) ABSTRACT

A seating arrangement for a vehicle cabin includes a first group having a number of seats and a second group having a number of seats. Each group extends laterally adjacent to each other along a longitudinal direction of the vehicle cabin. The first group having twice as many seats as the second group with respect to the longitudinal direction of the vehicle cabin.

20 Claims, 10 Drawing Sheets

(56) References Cited

U.S. PATENT DOCUMENTS

| | | | |
|---|---|---|---|
| 2010/0038485 A1* | 2/2010 | Harcup | B64D 11/0601 244/118.6 |
| 2012/0146372 A1* | 6/2012 | Ferry | B64D 11/0606 297/232 |
| 2012/0223186 A1 | 9/2012 | Henshaw | |
| 2013/0106156 A1* | 5/2013 | Orson | B64D 11/0643 297/217.3 |
| 2014/0306500 A1* | 10/2014 | Dryburgh | B64D 11/06 297/232 |
| 2015/0336674 A1* | 11/2015 | Foucher | B64D 11/0606 244/118.6 |
| 2017/0259921 A1* | 9/2017 | Valdes De La Garza | B64D 11/0604 |

FOREIGN PATENT DOCUMENTS

| | | |
|---|---|---|
| EP | 2944571 A1 | 11/2015 |
| WO | 2010100500 A2 | 9/2010 |
| WO | 2010100500 A3 | 9/2010 |
| WO | 2014049362 A1 | 4/2014 |
| WO | 2014087387 A2 | 6/2014 |
| WO | 2014087387 A3 | 6/2014 |

* cited by examiner

SEATING ARRANGEMENTS FOR A VEHICLE CABIN

CROSS REFERENCE TO RELATED APPLICATIONS

This application claims the benefit of priority under 35 U.S.C. § 120 of U.S. Provisional Patent Application 62/949,820 filed Dec. 18, 2019, the entire disclosure of which is hereby incorporated by reference herein.

FIELD

The present disclosure relates generally to seating arrangements for a vehicle cabin, in particular an aircraft cabin.

BACKGROUND

There are a wide variety of passenger modules and seating arrangements for a vehicle cabin, in particular for an aircraft cabin.

However, seating arrangements need to provide direct aisle access to improve privacy and comfort to passengers.

For example, a seating arrangement for a cabin of a passenger aircraft may comprise first, second and third suites which are positioned in the cabin in respective lateral adjacent outboard, middle and inboard positions.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples herein provide improved seating arrangements for a vehicle cabin of a passenger transport system, in particular of an aircraft. Examples herein provide improved seating arrangements providing a high density of seats and increased passenger (PAX) numbers while ensuring privacy, comfort and a direct aisle access to each passenger. For example, the seating arrangements provided herein are applicable to narrow body aircrafts and wide body aircrafts, in particular in view of business class solutions.

In an implementation provided herein is a seating arrangement for a vehicle cabin, in particular an aircraft cabin, comprising at least two directly adjoining groups having a number of seats and extending along a longitudinal direction of the vehicle cabin, wherein a first group comprises twice as many seats as a second group at least with respect to the longitudinal direction.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about." Similarly, the term, "plurality," as used herein may also be referred to as a list, collection, or ensemble.

Figure 1:
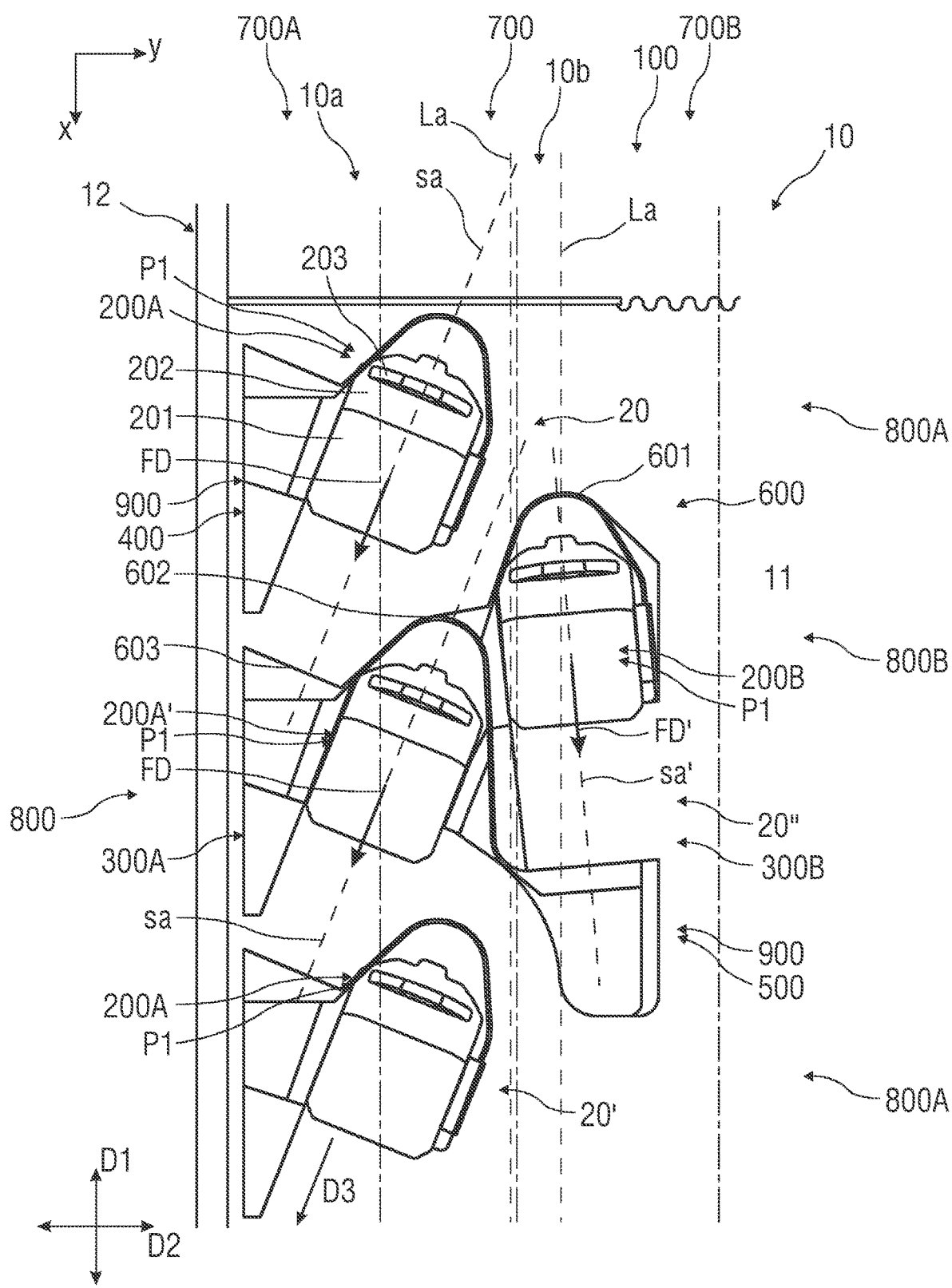
FIG. 1 shows schematically in a top view an embodiment of a seating arrangement for a vehicle cabin, in particular an aircraft cabin.
Figure 6:
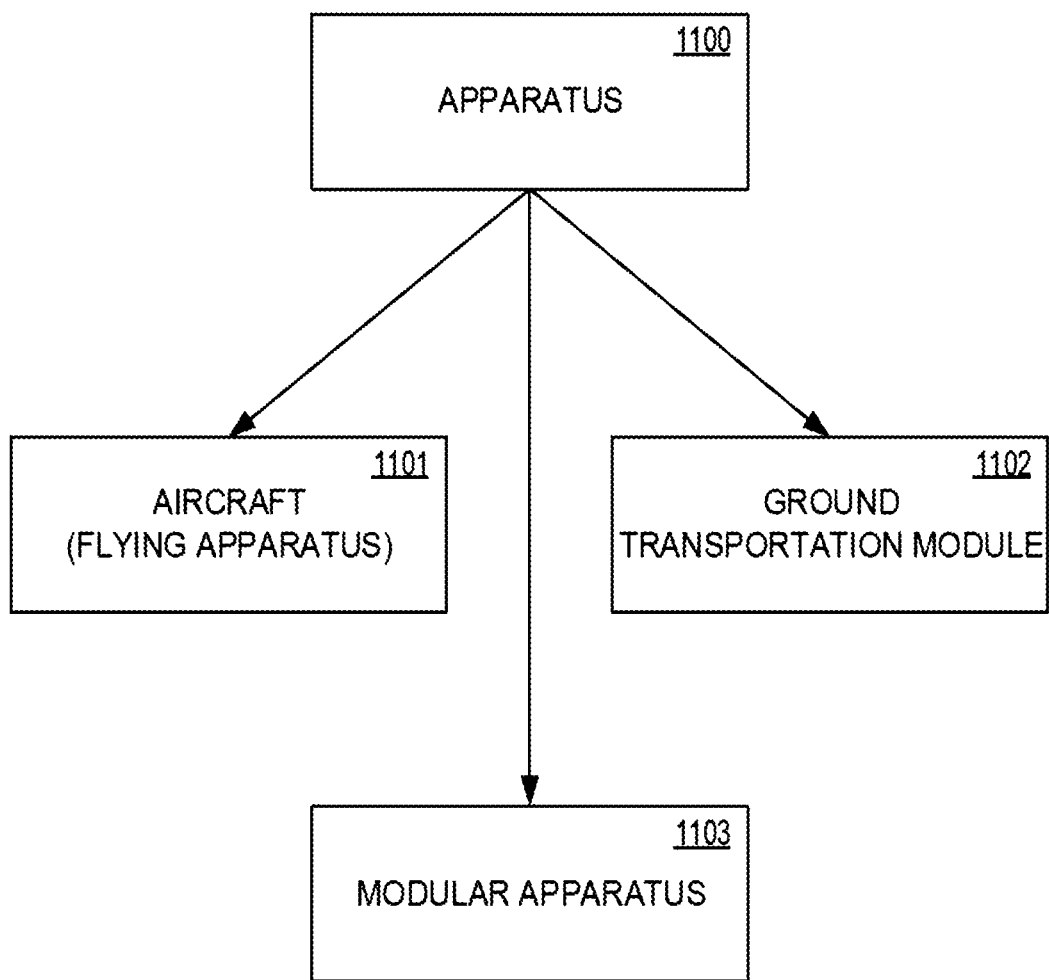
FIG. 6 shows a block diagram of an apparatus for which various aspects of the disclosure can be employed in accordance with an example.

FIG. 1 shows schematically in a top view an embodiment of a seating arrangement 100 for a vehicle cabin 10 of an apparatus 1100 as shown in FIG. 6. In the illustrated examples, the vehicle cabin 10 is an aircraft cabin, comprising a number of seats 200A, 200B. For example, a first number of seats 200A is arranged in a first group 10a and a second number of seats 200B is arranged in a second group 10b. FIG. 1 shows an example of a section of the vehicle cabin 10.

The first and second groups 10a, 10b may be seen as one group with a two-seat-arrangement in a transverse extension direction D2 of the vehicle cabin 10. The groups 10a, 10b extend in a longitudinal direction D1, for example a longitudinal extension direction D1, of the vehicle cabin 10. The seats 200A, 200B may be facing in flight direction. The first group 10a is arranged bordering a cabin wall 12. The second group 10b is arranged bordering an aisle 11 of the vehicle cabin 10.

The group 10a can be understood and seen as a column 700 or more columns 700a, 700b or row 800 or more rows 800a, 800b, extending in a longitudinal direction D1, for example parallel to a longitudinal axis La, of the vehicle cabin 10. The group 10a can be understood and seen as forming one column 700 or more columns 700a, 700b or forming one row 800 or more rows 800a, 800b extending in a transverse direction D2, for example a transverse extension direction D2, of the vehicle cabin 10.

For example, the seats 200A of the first group 10a are positioned angled with respect to the longitudinal axis La and facing in an outward direction D3 of the vehicle cabin 10.

For example, the seats 200B of the second group 10b are positioned substantially in-line relative to the longitudinal axis La.

Figure 3A:
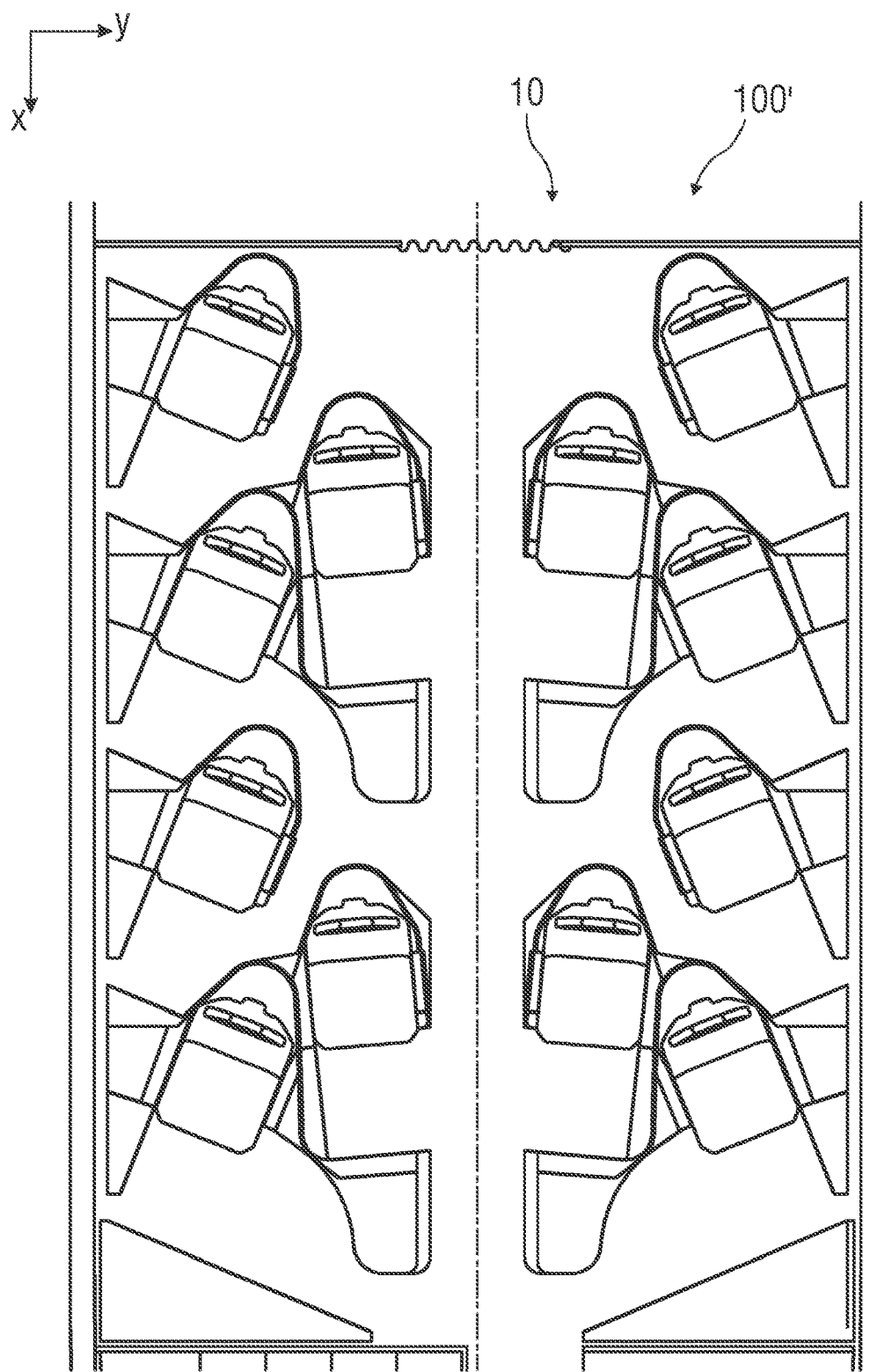
FIGS. 3A and 3B show schematically in top views embodiments of a seating arrangement for a vehicle cabin.
Figure 3B:
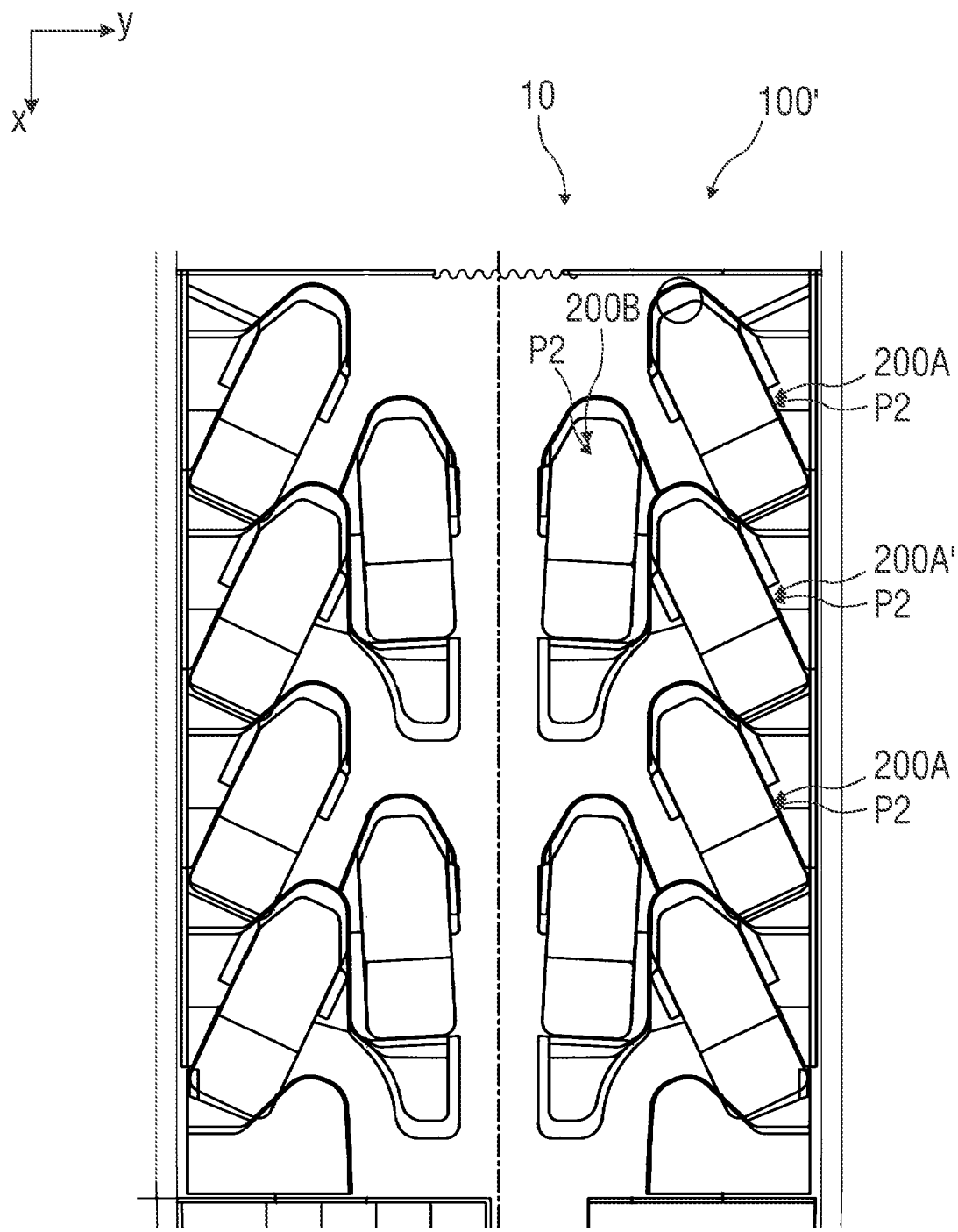

Each seat 200A, 200B is configured as being adjustable between at least a seating position P1 and at least a bed position P2, as shown in FIG. 3B. For example, each seat 200A, 200B is formed by at least a seat pan 201 and a backrest 202. Additionally, each seat 200A, 200B may comprise optionally a not further shown leg rest and/or head rest 203. For instance, each seat 200A, 200B can be brought into one or more positions, e.g. into the seating position P1 for a taxi, take-off, landing, at least an inclined comfort position and the bed position P2. For example, in the bed position P2 of the seat 200A, 200B the seat pan 201, the backrest 202 and optionally the leg rest and head rest 203 are brought into a substantially lie-flat, horizontal position.

The seating arrangement 100 comprises two directly adjoining groups 10a, 10b, wherein the first group 10a comprises twice as many seats 200A as the second group 10b at least with respect to the longitudinal direction D1 of the vehicle cabin 10. In particular, the seats 200A of the first group 10a are laterally offset to the seats 200B of the second group 10b.

Further, the first group 10a comprises a number of identical angled seats 200A oriented facing in a first direction FD with respect to a longitudinal direction D1 of the vehicle cabin 10. The second group 10b comprises a number of identical substantially forward facing seats 200B oriented facing substantially in-line with a longitudinal axis La parallel to the longitudinal direction D1 of the vehicle cabin 10. For example, the angled seats 200A and the forward facing seat 200B are facing in different directions FD, FD'. Each seat 200A, 200B has a direct aisle access 20 to 20". The direct aisle accesses 20, 20' for two angled seats 200A, arranged one behind another in staggered manner, run between two forward facing seats 200B arranged one behind another. In particular, the direct aisle accesses 20, 20' of the angled seats 200A intersect between two forward facing seats 200B.

Each forward facing seat 200B is an aisle seat 200B. For further description reference 200B will be used for terms referring to a forward facing aisle seat 200B. Each angled seat 200A may be a non-aisle seat 200A or an aisle seat 200A. For further description reference 200A will be used for terms referring to an angled seat 200A, an angled non-aisle seat 200A, for example shown in FIG. 1, or an angled aisle seat 200A, for example shown in FIG. 4A. For example, each non-aisle seat 200A is a window seat. Each aisle seat 200A, 200B is arranged bordering the aisle 11.

Even if the angled seats 200A are configured identically, in the further description the reference number 200A' will be used to describe the angled seat of the first group 10a which is arranged laterally adjacent of the forward facing seat 200B of the second group 10b.

Figure 2A:
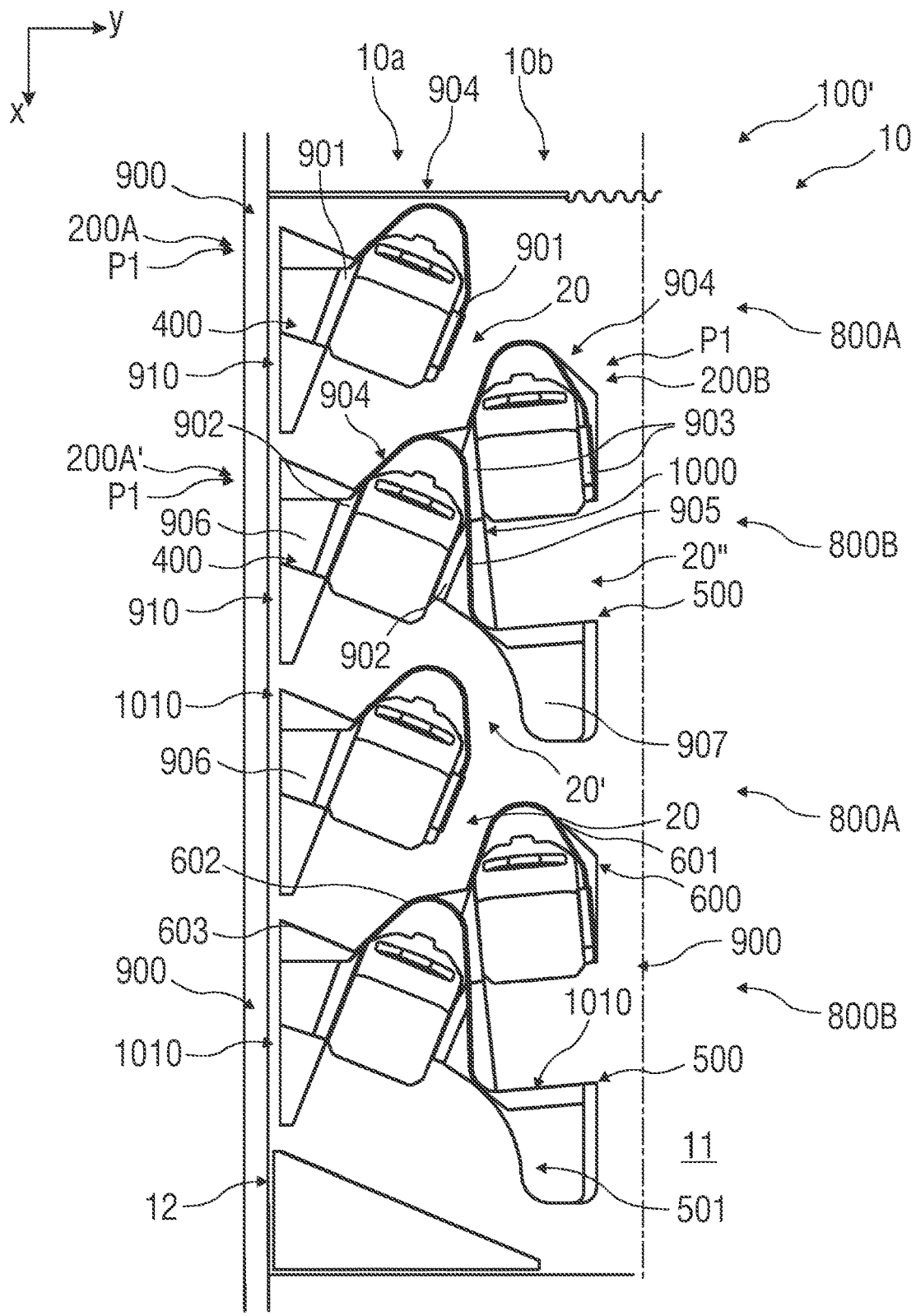
FIGS. 2A and 2B show schematically in top views embodiments of a seating arrangement for a vehicle cabin, comprising a plurality of seats.

The first group 10a having first angled seats 200A and second angled seats 200A' arranged laterally offset with respect to a seat 200B of the second group 10b, and every second seat 200A' of the first group is arranged laterally adjacent relative to a seat 200B of the second group 10b along a shared boundary 1000, an example is shown in FIG. 2A.

The first angled seats 200A and second angled seats 200A' are arranged offset relative to the longitudinal direction D1 and alternating along the longitudinal direction D1.

For example, every first angled seat 200A of the first group 10a having a single seat which is partially enclosed between two second seats 200A' and their respective laterally adjacent seats 200B of the second group 10b, an example is shown in FIG. 2A.

For example, every second angled seat 200A' of the first group 10a having an aisle access 20' in front of the laterally adjacent seat 200B of the second group 10b. Every first angled seat 200A of the first group 10a having an aisle access 20 provided between two seats 200B of the second group 10b.

For example, the first angled seat 200A of the first group 10a having a first aisle access 20. The second angled seat 200A' of the first group 10a having a second aisle access 20'. The first aisle access 20 and the second aisle access 20' merge in a region between two seats 200B of the second group 10b.

Each seat 200A, 200A', 200B comprises a privacy area 300A, 300B and being delimited by a number of furniture parts 900 from each other. For example, the furniture parts 900 may be, as best shown in FIG. 2A: lateral armrests 901 to 903, each provided on one lateral side of each seat 200A, 200A', 200B, partition walls 904 arranged at least partially surrounding each seat 200A, 200A', 200B, side utility elements 400 lateral adjacent to every angled seat 200A, 200A' divider screens 905 laterally delimiting the respective privacy areas 300B of the forward facing seats 200B from respective privacy areas 300A of the angled seats 200A. For example, the divider screen 905 is arranged between the forward facing seat 200B and a laterally adjacent and adjoining angled seat 200A', for example within the same row 800B or column 700. Further, the furniture parts 900 may comprise foot support structures 906, 907. The foot support structures 906 of each angled seat 200A, 200A' are provided within each side utility element 400 arranged in the front. The foot support structure 907 of the forward facing seat 200B may be part of a separate compartment element 500 arranged in front of the corresponding forward facing seat 200B with respect of the orientation of the forward facing seat 200B. When the seats 200A, 200A', 200B are positioned in bed position P2, a height of the backrest 202, the seat pan 201 and optionally the leg-rest corresponds to a height of the foot support structure 906, 907 creating a horizontal flat bed for passengers.

For example, the privacy areas 300A of the angled seats 200A, 200A' are configured identically.

For example, as shown in FIG. 2A, the angled seat 200A' of the first group 10a having a lateral armrest 902 arranged in an area of the shared boundary 1000. The forward facing seat 200B of the second group 10b having a lateral armrest 903 arranged in the area of the shared boundary 1000. The lateral armrest 902 of the angled seat 200A' is arranged in front of the lateral armrest 903 of the laterally adjacent forward facing seat 200B in the longitudinal direction D1. The lateral armrest 902 is arranged laterally and longitudinally offset to the lateral armrest 903. To separate the privacy areas 300A and 300B of the laterally adjacent seats 200A' and 200B, the divider screen 905 is arranged along the shared boundary 1000.

The side utility elements 400 are configured as consoles 910 for passenger use. For example, each side utility element 400 may comprise a not in detail shown shelf, a table, storage space and storage means. The storage means may provide storage space for a remote control, magazines, suitcases, shoes, headphones or other items belonging to the passenger or airline. Additionally, the side utility element 400 may comprise not in detail shown service and operational elements, such as switches and HMI-panel to control operable features of the seat 200A or features provided within a respective privacy area 300A, 300B. In particular, the side utility elements 400 provide a substantially triangular shape, particularly a triangular-prism shape.

The compartment element 500 and/or the foot support structure 907 associated with the forward facing seat 200B provides a substantially triangular, triangular-prism or rectangular, rectangular-prism or square, cube shaped. In particular, one side of the compartment element 500 and/or the foot support structure 907 is curved in such manner, that more access space is provided to the lateral adjacent angled seat 200A, 200A' of the same row 800B.

For example, each side utility element 400 and compartment element 500 having an entertainment device 1010, indicated in FIG. 2A. The entertainment device 1010 is facing towards a rear seat. The entertainment device 1010 may comprise not further shown screens such as displays and/or infotainment service devices.

For example, the compartment element 500 has a substantially bent inward portion such as a bend 501 as shown in FIG. 2A.

For example, a total length of the forward facing seat 200B and its respective privacy area 300B at least partially overlap areas of three angled seats 200A, 200 A' arranged one behind another in one group 10a. For instance, one forward facing seat 200B and its respective privacy area 300B are associated to three angled seats 200A, 200A'. Due to this configuration and the alternating sequence of rows 800A, 800B it is possible to create a group 10a with twice as many seats 200A as the other group 10b. The second row 800B may comprise two seats 200A', 200B configured as one seating unit or passenger module.

Each forward facing seat 200B and/or a respective privacy area 300B of the forward facing seat 200B is in connection with every second angled seat 200A'. In particular, each forward facing seat 200B shares one divider screen 905 with every second angled seat 200A'. Further, each forward facing seat 200B and every second angled seat 200A' are distanced to each other by each of their respective armrests 902, 903.

For example, a direct aisle access 20' of a front angled seat 200A, 200A merges with a direct aisle access 20 of a rear angled seat 200A' in a region between two forward facing seats 200B. In particular, every direct aisle access 20 and 20' of the angled seats 200A, 200A are connected to each other to a substantially U-shape. Moreover, an additional privacy for passengers of the angled seats 200A, 200A' is provided due to the specific extending shapes of the direct aisle accesses 20, 20'.

For example, each aisle access 20, 20' has a substantially curved shape.

The direct aisle access 20" of the forward facing seat 200B is extending substantially perpendicular to the respective seat axis sa' of the forward facing seat 200B. This direct aisle access 20" is provided between the forward facing seat 200B and the corresponding compartment element 500. The forward facing seat 200B provides a wide direct aisle access 20". For example, the forward facing seat 200B may be offered to passengers with disabilities. The forward facing seat 200B and the respective privacy area 300B may be configured to comply with so called DOT requirements.

Further, the seating arrangement 100 comprises at least two rows 800A, 800B each having a different number of seats 200A to 200B, in particular counted in transverse direction D2 of the vehicle cabin 10. The rows 800A, 800B are arranged alternating along the longitudinal direction D1 of the vehicle cabin 10. The first row 800A comprises one angled single seat 200A oriented facing in a first direction FD with respect to a longitudinal direction D1 of the vehicle cabin 10. The second row 800B is arranged in front of the first row 800A comprising an angled seat 200A' and a substantially lateral adjacent forward facing seat 200B, wherein a distance between the forward facing seat 200B and the lateral adjacent angled seat 200A' is less than a distance between the forward facing seat 200B and the rear angled seat 200A.

Moreover, the second row 800B comprises a side utility element 400, wherein the forward facing seat 200B is arranged adjacent to a lateral side of the respective angled seat 200A', and the side utility element 400 is arranged on the other lateral side of the angled seat 200A'. That means that the utility element 400 is laterally arranged on opposite sides of the same angled seat 200A' of the second row 800B. The side utility element 400 comprises a foot support structure 906 for the rear angled seat 200A, that means of the first row 800A.

The side utility elements 400 are arranged one behind another.

Furthermore, the forward facing seat 200B, the corresponding angled seat 200A' of the same row 800B and its side utility element 400 are connected to each other on their rear facing side via a vertical side wall 600. The vertical side wall 600 comprises at least a three-step decreasing shape with respect to the transverse direction D2 or the longitudinal direction D1 of the vehicle cabin 10. Each step 601 to 603 having a different distance to the rear angled seat 200A of the first row 800A, for example as shown in FIGS. 1 and 2A.

For example, the first step 601 is defined by the partition wall 904 arranged behind the forward facing seat 200B. The second step 602 is defined by the partition wall 904 arranged behind the angled seat 200A' laterally adjacent to the forward facing seat 200B. The third step 603 is defined by a rear facing side of the side utility element 400 associated with the angled seat 200A'.

The shape of the vertical wall 600 and its arrangement with respect to the single seat 200A enables a configuration of the aisle access 20.

In one example, the first step 601 is arranged laterally distanced of a rear angled seat 200A. For example, the first step 601 is arranged distanced to an area of the lateral armrest 901 of the rear angled seat 200A. The second step 602 is arranged longitudinally distanced, for example in front of the rear angled seat 200A. For example, the second step 602 is arranged distanced and in front of an area of the armrest 901 of the rear angled seat 200A. The step 603 is arranged longitudinally distanced, for example in front of the rear angled seat 200A. For example, the step 603 is arranged distanced and in front of a seat pan 201 of the rear angled seat 200A.

For example, a distance between the seat pan 201 of the forward facing seat 200B and a backrest 202 of the lateral adjacent angled seat 200A' of the same row 800B is less than a distance between a backrest 202 of the same forward facing seat 200B and a seat pan 201 of the rear angled seat 200A of the first row 800A.

The seats 200A to 200B are movable along their respective seat axis sa to sa' between the seating position P1 and the bed position P2. It is to be understood that each respective seat axis sa to sa' corresponds to a longitudinal extension and moving direction of each respective seat 200A to 200B when moving between the seating position P1 and the bed position P2 and vice versa.

The angled seats 200A, 200A' each having a respective seat axis sa which is located angled with respect to the longitudinal axis La. The forward facing seat 200B has a respective seat axis sa' which is located substantially parallel or with a marginal angle with respect to the longitudinal axis La.

The angled seats 200A, 200A' of each row 800A, 800B are identical, that means the angled seats 200A, 200A' have the same angle with respect to the longitudinal axis La. For example, the angled seats 200A, 200A' are positioned by a predefined angle of about more than 15°, preferably more than 20°, in particular about 25°. For example, the angled seats 200A, 200A' are oriented facing inwardly or outwardly depending on an orientation with respect to the aisle 11 provided within the vehicle cabin 10. Optionally, angles of the angled seats 200A, 200A' may differ from each other. The forward facing seat 200B is positioned by a predefined angle of about less than −10°, preferably less than 7°, in particular less or about 5°. The forward facing seat 200B may be a so called in-line facing seat 200B having a respective seat axis sa' substantially parallel to the longitudinal direction D1 of the vehicle cabin 10.

Figure 2B:
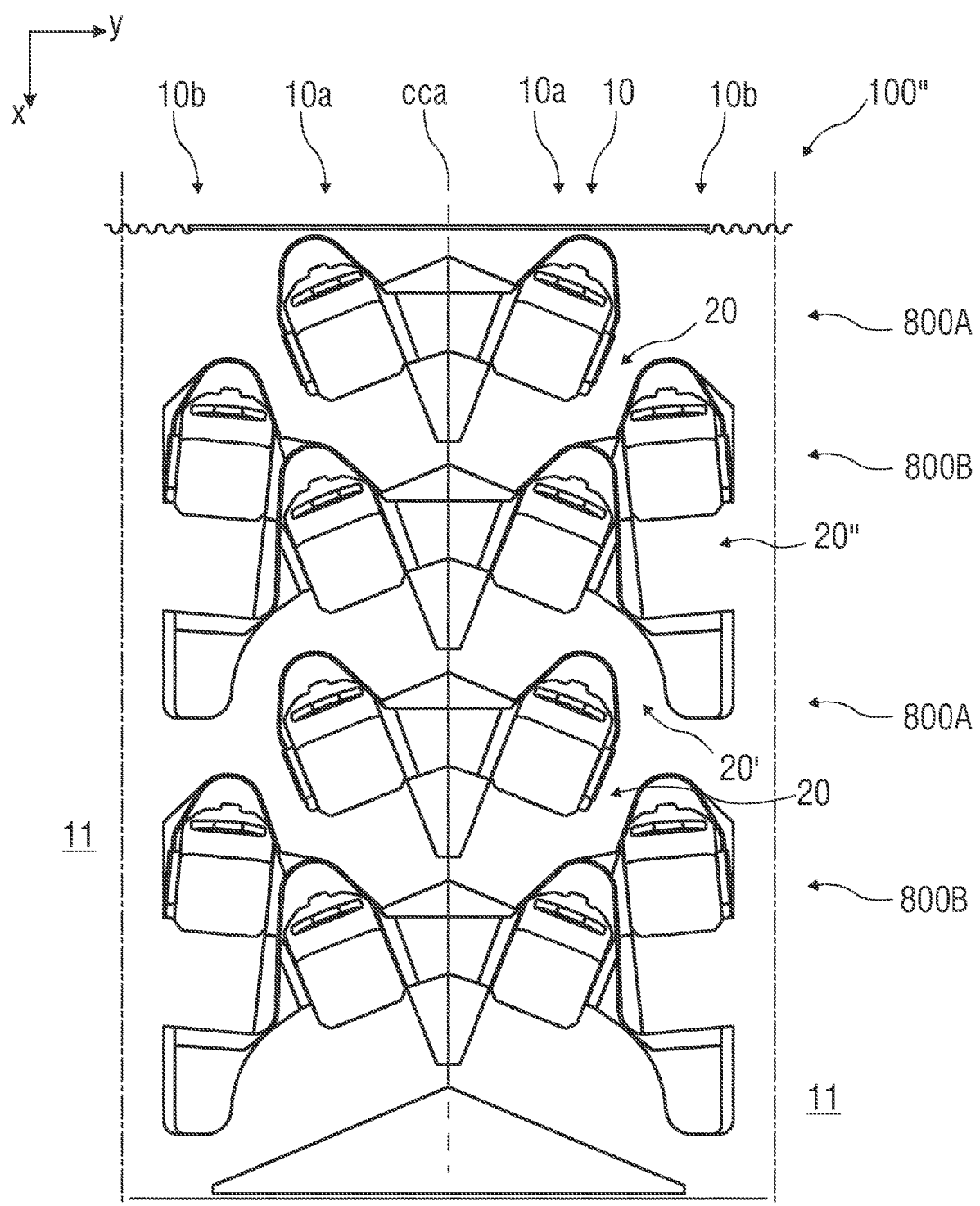

FIGS. 2A and 2B show schematically in top views embodiments of seating arrangements 100', 100" for a vehicle cabin 10, comprising a plurality of seats 200A to 200B. For example, FIG. 2A shows a seating arrangement 100' having a first group 10a bordering the cabin wall 12 and a second group 10b bordering the aisle 11. Moreover, the groups 10a, 10b comprise a number of identical sequences of alternating rows 800A, 800B. For example, FIG. 2B shows a seating arrangement 100" having four groups 10a, 10b alternating in a transverse direction of the vehicle cabin 10, wherein the groups 10a and 10b are mirrored along a center axis cca of the vehicle cabin 10, for example of a wide body aircraft. The groups 10b are each bordering an aisle 11.

FIGS. 3A and 3B show schematically in top views embodiments of a seating arrangement 100' for a vehicle cabin 10, for example of a narrow body aircraft.

Figure 4A:
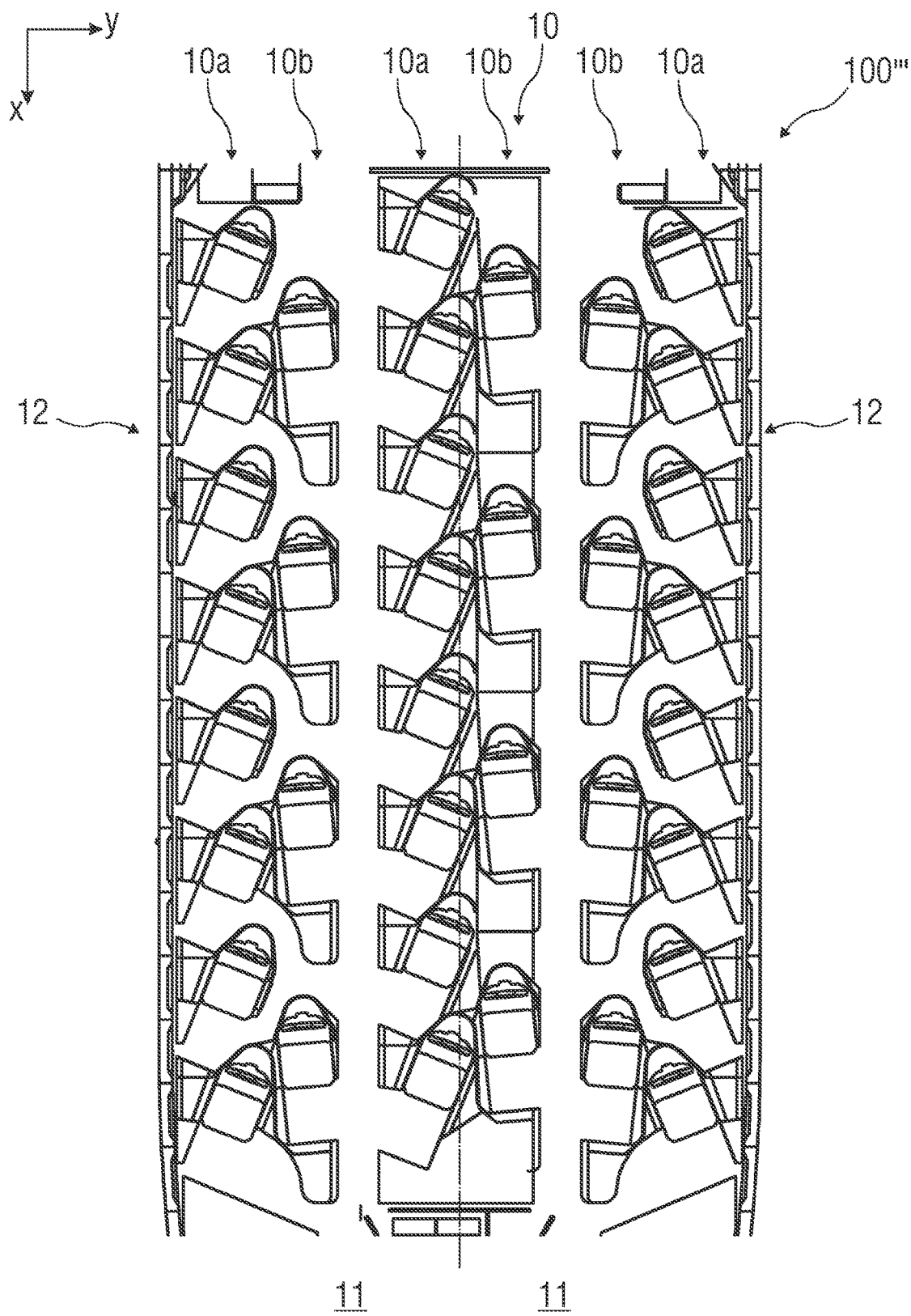
FIGS. 4A and 4B show schematically in top views embodiments of seating arrangements for a vehicle cabin.
Figure 4B:
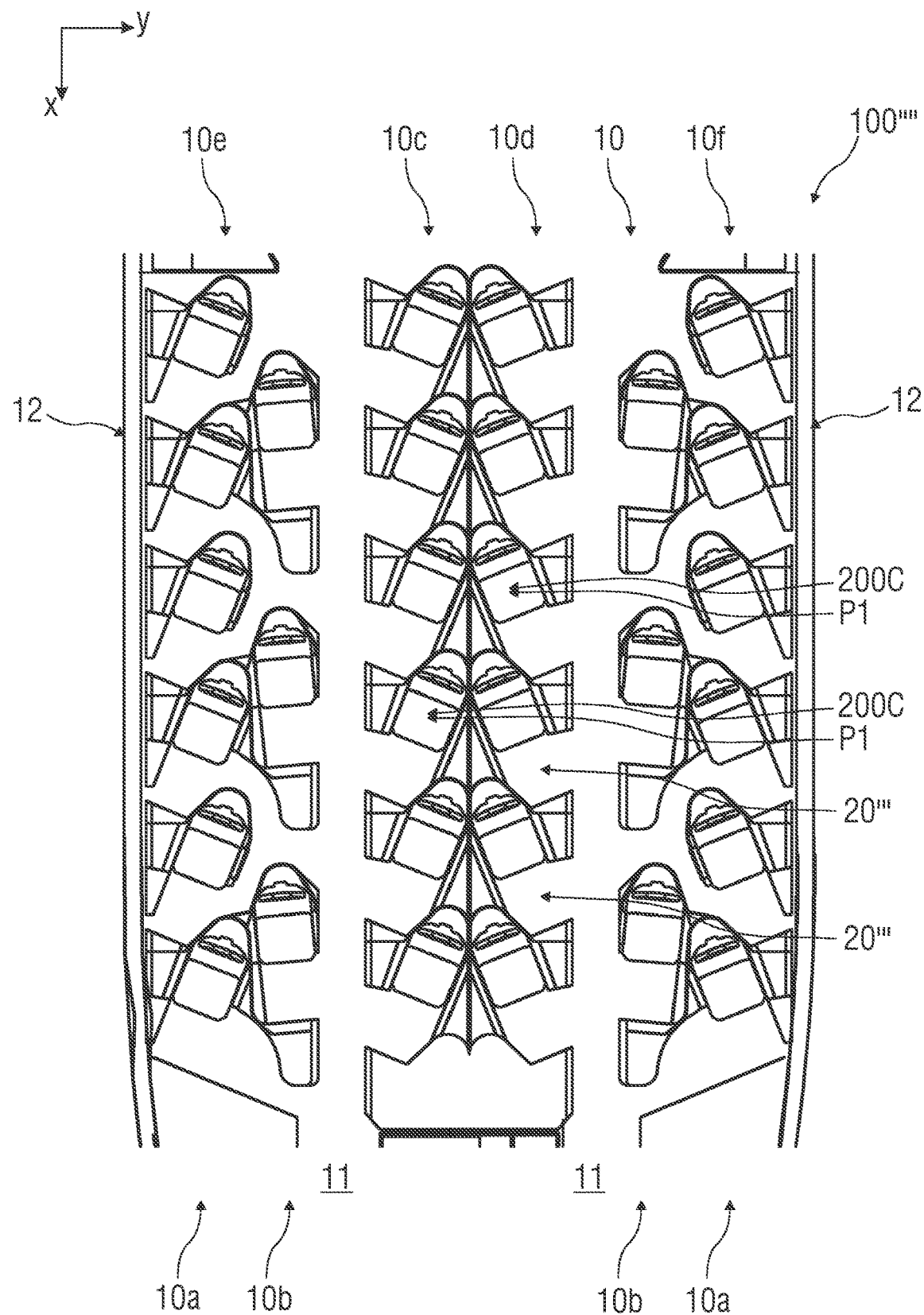

FIGS. 4A and 4B show schematically in top views embodiments of seating arrangements 100''', 100'''' for a vehicle cabin 10, for example of a wide body aircraft.

The seating arrangement 100''' shown in FIG. 4A comprises a plurality of alternating groups 10a and 10b in a transverse direction of the vehicle cabin 10. For instance, groups 10a and 10b arranged in a center section of the vehicle cabin 10 (sections division seen in transverse direction) are arranged offset to the groups 10a, 10b of outer/cabin wall sections. Between the center section and each outer/cabin wall section an aisle 11 is arranged.

The seating arrangement 100'''' shown in FIG. 4B comprises a first center group 10c and a second center group 10d each comprising a number of angled seats 200C forming a so called herringbone seating layout. Each angled seat 200C having a direct aisle access 20'''. The angled seats 200C may be different or identical to the angled seats 200B. The center groups 10c, 10d are arranged adjacent to each other in a transverse direction of the vehicle cabin 10 and may be divided by a number of divider assemblies arranged along the center axis cca of the vehicle cabin 10. Further, the seating arrangement 100'''' comprises two outer groups 10e, 10f and two aisles 11 provided between a center group 10c, 10d and an outer group 10e, 10f. In this case it is to be understood that each outer group 10e, 10f is configured by the directly adjoining groups 10a, 10b, such as sub-groups, as described above. The seats 200C may also be one of a forward facing or an outward facing or an inward facing seat 200C.

Figure 5:
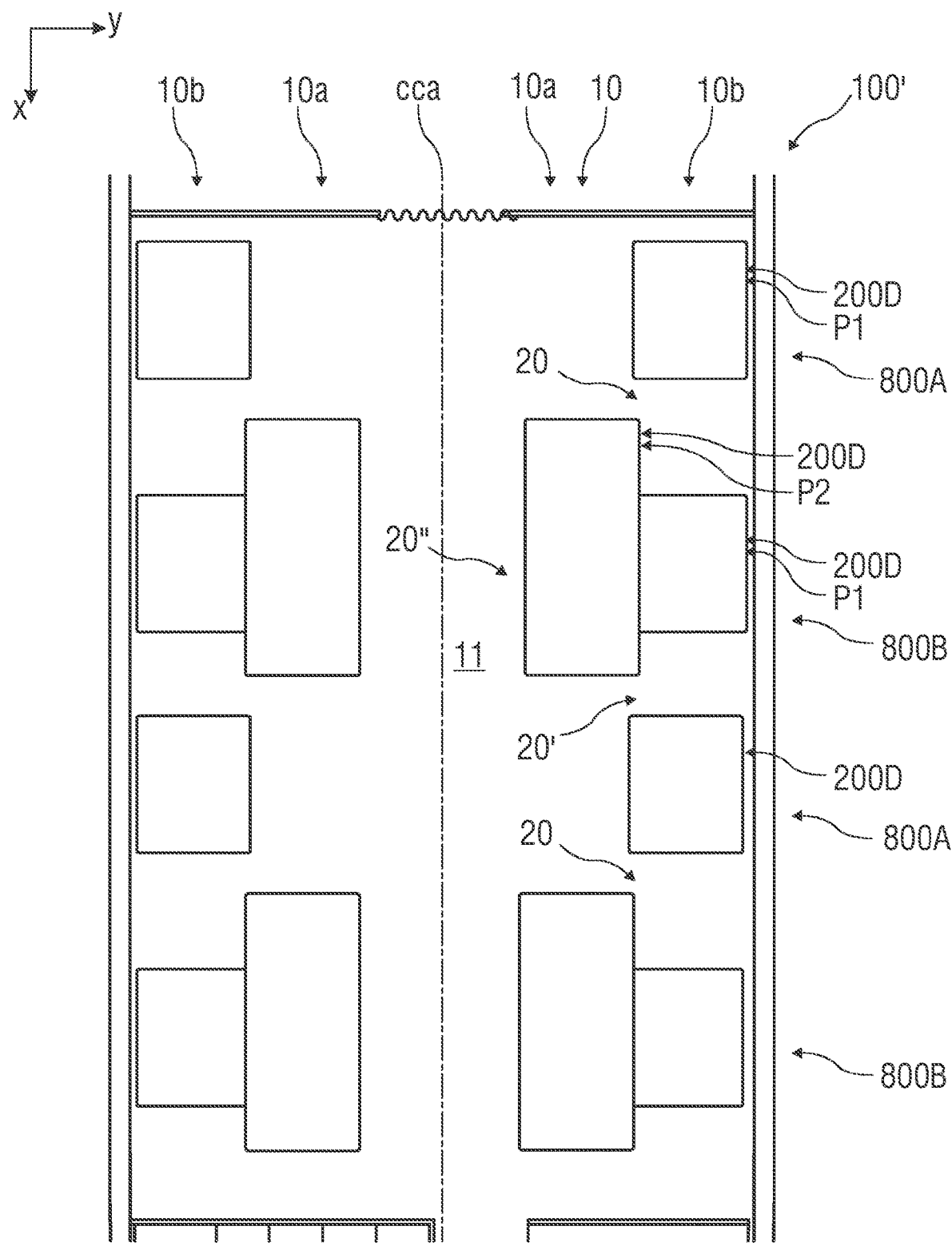
FIG. 5 shows schematically in a top view an embodiment of a seating arrangement for a vehicle cabin, in particular an aircraft cabin.

FIG. 5 shows schematically in a top view an embodiment of a seating arrangement 100' for a vehicle cabin 10, for example of a narrow body aircraft, comprising a plurality of seats 200D. For example, the seats 200D are configured as forward facing seats 200D.

With reference now to FIG. 6, the apparatus 1100 is provided. As shown in FIG. 6, an example of the apparatus 1100 is a flying apparatus 1101, such as an aerospace vehicle, aircraft, air cargo, flying car, satellite, planetary probe, deep space probe, solar probe, and the like. As also shown in FIG. 6, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 6 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 7:
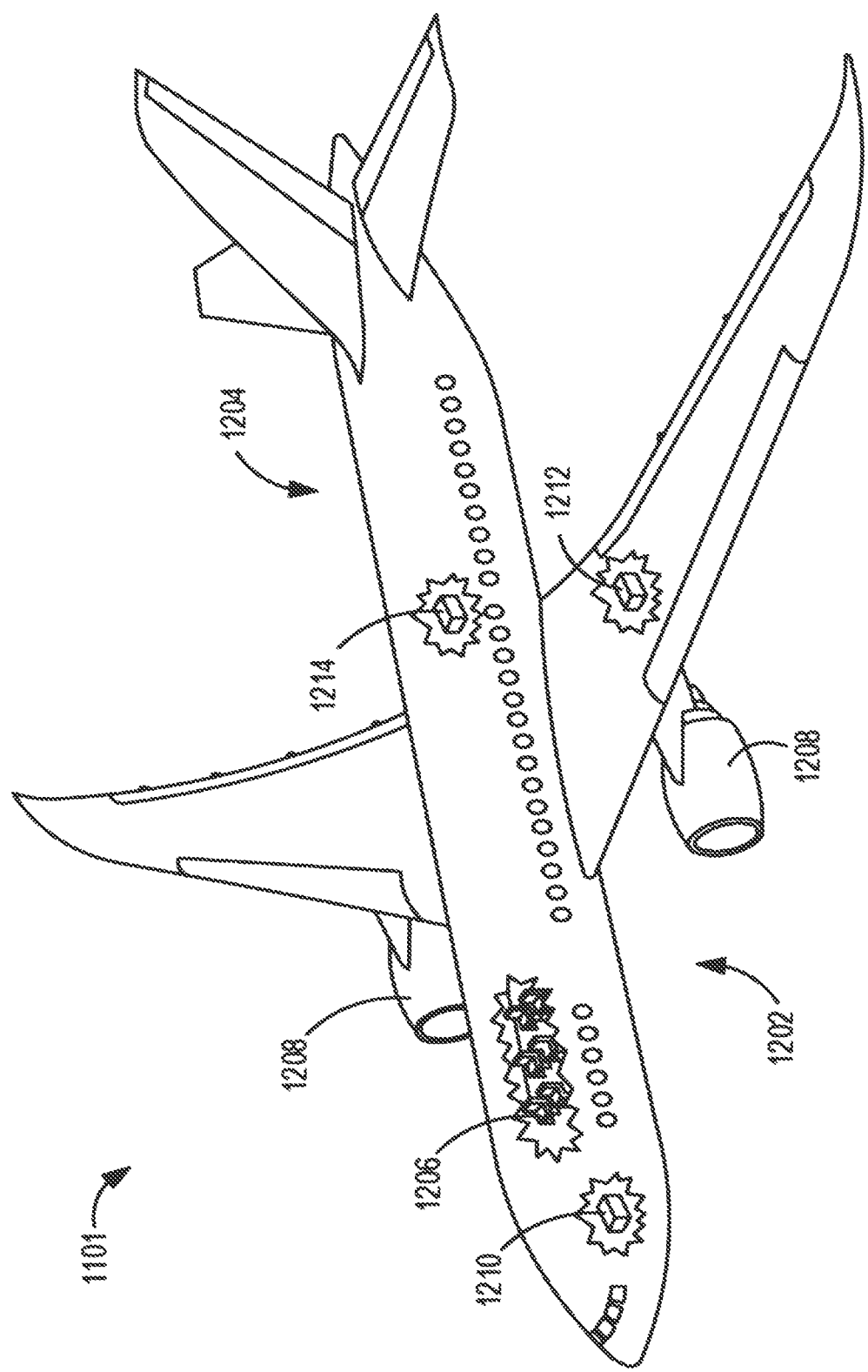
FIG. 7 shows a schematic perspective view of a particular flying apparatus in accordance with an example.

With reference now to FIG. 7, a more specific diagram of the flying apparatus 1101 is depicted in which an implementation of the disclosure is advantageously employed. In this example, the flying apparatus 1101 is an aircraft produced by an apparatus manufacturing and service method and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

An advantage of each passenger seating arrangement of the present invention is to optimize a use of space within the vehicle cabin whilst providing maximum comfort and privacy for the passengers. For example, in each proposed seating arrangement the seats are at least staggered in transverse direction of the vehicle cabin in such way that a substantially narrow total column width is achieved. Furthermore advantageously is that each proposed seating arrangement of the present invention allows applying a comparatively high number of non-aisle seats, for example such as angled seats, in particular window seats, in combination with a different number of aisle seats within the vehicle cabin.

The present invention offers a specific, novel seating layout and design having combined angled and forward facing seats compared to already known seating arrangements, such as simple so called in-line seating layouts and herringbone seating layouts. The seating arrangements according to the disclosure may each increase an optical appearance of the vehicle cabin providing a feeling to the passengers of a new aircraft cabin design having individual privacy areas and aisle accesses. Each seat is provided with same features.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Clauses

Further, the disclosure comprises embodiments according to the following clauses:

Clause 1. A seating arrangement for a vehicle cabin, wherein the seating arrangement comprising:
a first group having a number of seats;
a second group having a number of seats; and
each group extending laterally adjacent to each other along a longitudinal direction of the vehicle cabin;
wherein the first group having twice as many seats as the second group with respect to the longitudinal direction of the vehicle cabin.

Clause 2. The seating arrangement of clause 1, further comprising privacy areas associated with the seats of the second group and aligned with the seats of the second group substantially along the longitudinal direction.

Clause 3. The seating arrangement of clause 1, wherein the seats of the second group having privacy areas which total length at least partially overlaps privacy areas of the seats of the first group in the longitudinal direction.

Clause 4. The seating arrangement of clause 1, further comprising foot support structures associated with the seats of the second group, the foot support structures having a substantially triangular shape, triangular-prism or rectangular, rectangular-prism or square, or cube shape.

Clause 5. The seating arrangement of clause 1, wherein the first group having first seats and second seats arranged laterally offset with respect to a seat of the second group, and every second seat of the first group is arranged laterally adjacent relative to a seat of the second group along a shared boundary.

Clause 6. The seating arrangement of clause 5, wherein the first seats and second seats are arranged offset relative to the longitudinal direction and alternating along the longitudinal direction.

Clause 7. The seating arrangement of clause 5, wherein every first seat of the first group having a single seat which is partially enclosed between two second seats and their respective laterally adjacent seats of the second group.

Clause 8. The seating arrangement of clause 5, wherein every second seat of the first group having an aisle access in front of the laterally adjacent seat of the second group.

Clause 9. The seating arrangement of clause 5, wherein every first seat of the first group having an aisle access between two seats of the second group.

Clause 10. The seating arrangement of clause 5, wherein the first seat of the first group having a first aisle access, the second seat of the first group having a second aisle access, and the first aisle access and the second aisle access merge in a region between two seats of the second group.

Clause 11. The seating arrangement of clause 5, wherein each seat having a seat pan and a backrest, and a distance between the seat pan of the seat of the second group and the backrest of the second seat of the first group is less than a distance between the backrest of the seat of the second group and the seat pan of the first seat of the first group.

Clause 12. The seating arrangement of clause 5, further comprising side utility elements each associated with the first seat and the second seat of the first group, each side utility element arranged laterally adjacent to the first seat or the second seat, wherein the second seat and the respective laterally adjacent seat of the second group and the side utility element are connected to each other along a shared vertical side wall.

Clause 13. The seating arrangement of clause 12, wherein the vertical side wall having a three-step decreasing shape with respect to the longitudinal direction, and each step having a different distance to first seat of the first group.

Clause 14. The seating arrangement of clause 12, wherein each second seat of the first group is arranged between a respective side utility element associated with the second seat and the respective laterally adjacent seat of the second group, and the side utility element having a foot support structure.

Clause 15. The seating arrangement of clause 1, wherein the first group having a number of angled seats positioned angled relative to the longitudinal direction, and the second group having a number of substantially forward facing seats arranged substantially facing along the longitudinal direction.

Clause 16. The seating arrangement of clause 1, wherein the first group having a number of angled seats having identical seat axes with respect to a longitudinal axis of the vehicle cabin, and the angled seats facing in an outward direction of the vehicle cabin.

Clause 17. The seating arrangement of clause 1, wherein the first group having seats positioned by a predefined angle of about more than 15° with respect to a longitudinal axis of the vehicle cabin.

Clause 18. The seating arrangement of clause 1, wherein the second group having seats positioned by a predefined angle of about less than −10° with respect to a longitudinal axis of the vehicle cabin.

Clause 19. The seating arrangement of clause 1, wherein the seats of the first group having a respective privacy area having:

two lateral armrests;
a partition wall arranged at least partially surrounding the first seat;
a side utility element; and
a foot support structure.

Clause 20. The seating arrangement of clause 1, wherein the seats of the second group having a respective privacy area having:
two lateral armrests;
a partition wall arranged at least partially surrounding the first seat;
a divider screen; and
a foot support structure.

Clause 21. A method of installing the seating arrangement of clause 1 in an aircraft.

The invention claimed is:

1. A seating arrangement for a vehicle cabin comprising:
a first group having a first seat and a second seat bordering a cabin wall of the vehicle cabin, the first seat comprising a first foot support structure that extends on a lateral side of the second seat between the second seat and the cabin wall;
a second group having a third seat bordering an aisle of the vehicle cabin, the third seat comprising a second foot support structure;
the second seat of the first group and the third seat of the second group extending laterally adjacent and adjoining to each other along a longitudinal direction of the vehicle cabin with a divider screen arranged therebetween;
wherein the first and second seats of the first group include seat axes that extend approximately parallel to each other and are angled outwardly with respect to the longitudinal direction of the vehicle cabin; and
wherein the second foot support structure of the third seat, the divider screen, a lateral armrest of the third seat, a partition wall arranged behind the second seat, and the first foot support structure of the first seat define a continuous interconnected structure that extends between the third seat and the second seat and between the second seat and the first seat.

2. The seating arrangement of claim 1, further comprising a privacy area associated with the third seat of the second group and aligned with the third seat of the second group substantially along the longitudinal direction.

3. The seating arrangement of claim 1, wherein the third seat of the second group has a privacy area with a length that at least partially overlaps privacy areas of the first and second seats of the first group in the longitudinal direction.

4. The seating arrangement of claim 1, wherein at least one of the first foot support structure or the second foot support structure comprises one or more of a triangular shape, triangular-prism or rectangular shape, rectangular-prism or square shape, or cube shape.

5. The seating arrangement of claim 1, wherein the first seat and the second seat of the first group are arranged offset relative to the longitudinal direction and alternating along the longitudinal direction.

6. The seating arrangement of claim 1, wherein the second seat of the first group comprises an aisle access in front of the third seat of the second group.

7. The seating arrangement of claim 1, wherein the first seat of the first group comprises an aisle access behind the third seat of the second group.

8. The seating arrangement of claim 1, wherein each seat comprises a seat pan and a backrest, and a distance between the seat pan of the third seat of the second group and the backrest of the second seat of the first group is less than a distance between the backrest of the third seat of the second group and the seat pan of the first seat of the first group.

9. The seating arrangement of claim 1, further comprising side utility elements associated with the first seat and the second seat of the first group, each side utility element arranged laterally adjacent to the first seat or the second seat, wherein the second seat of the first group, the third seat of the second group, and the side utility element of the second seat are connected to each other along a shared vertical side wall.

10. The seating arrangement of claim 9, wherein the second seat of the first group is arranged between a side utility element associated with the second seat and the third seat of the second group, the side utility element extending on a lateral side of the second seat between the second seat and the cabin wall, the side utility element comprising the first foot support structure of the first seat.

11. The seating arrangement of claim 1, further comprising a vertical side wall having a three-step shape with respect to at least one of the longitudinal direction or a transverse direction of the vehicle cabin.

12. The seating arrangement of claim 1, wherein the third seat of the second group is arranged substantially forward facing along the longitudinal direction.

13. The seating arrangement of claim 1, wherein the first and second seats of the first group are positioned by a predefined angle of about more than 15° with respect to a longitudinal axis of the vehicle cabin.

14. The seating arrangement of claim 1, wherein the third seat of the second group is positioned by a predefined angle of about less than −10° with respect to a longitudinal axis of the vehicle cabin.

15. The seating arrangement of claim 1, wherein the second seat of the first group comprises a side utility element extending on the lateral side of the second seat between the second seat and the cabin wall, the side utility element comprising the first foot support structure of the first seat, wherein the side utility element comprises an entertainment device facing toward the first seat of the first group.

16. A seating arrangement for a vehicle cabin comprising:
a first group having a first seat and a second seat bordering a cabin wall of the vehicle cabin, the first seat comprising a first foot support structure that extends on a lateral side of the second seat between the second seat and the cabin wall;
a second group having a third seat bordering an aisle of the vehicle cabin, the third seat comprising a second foot support structure;
the second seat of the first group and the third seat of the second group extending laterally adjacent and adjoining to each other along a longitudinal direction of the vehicle cabin with a divider screen arranged therebetween;
wherein the first and second seats of the first group include seat axes that extend approximately parallel to each other and are angled outwardly with respect to the longitudinal direction of the vehicle cabin;
wherein the third seat of the second group includes a seat axis that is angled inwardly with respect to the longitudinal direction of the vehicle cabin; and
wherein the second foot support structure of the third seat, the divider screen, a lateral armrest of the third seat, a partition wall arranged behind the second seat, and the first foot support structure of the first seat define a continuous interconnected structure that extends between the third seat and the second seat and between the second seat and the first seat.

17. The seating arrangement of claim 16, wherein the second seat of the first group, the third seat of the second group, and a side utility element of the second seat are connected to each other along a shared vertical side wall.

18. The seating arrangement of claim 16, further comprising first and second side utility elements associated with the second seat of the first group, the first and second side utility elements being arranged on opposite lateral sides of the second seat of the first group.

19. The seating arrangement of claim 16, wherein the second seat of the first group comprises a side utility element extending on the lateral side of the second seat between the second seat and the cabin wall, the side utility element comprising the first foot support structure of the first seat, wherein the side utility element comprises an entertainment device facing toward the first seat of the first group.

20. A seating arrangement for a vehicle cabin comprising:
- a first group having a first seat and a second seat bordering a cabin wall of the vehicle cabin, the first seat comprising a first foot support structure;
- a second group having a third seat bordering an aisle of the vehicle cabin, the third seat comprising a second foot support structure;
- the second seat of the first group and the third seat of the second group extending laterally adjacent and adjoining to each other along a longitudinal direction of the vehicle cabin with a divider screen arranged therebetween;
- a side utility element associated with the second seat of the first group, the side utility element extending on a lateral side of the second seat between the second seat and the cabin wall, the side utility element comprising the first foot support structure of the first seat, wherein the side utility element comprises an entertainment device facing toward the first seat of the first group;
- wherein the first and second seats of the first group include seat axes that extend approximately parallel to each other and are angled outwardly with respect to the longitudinal direction of the vehicle cabin;
- wherein the second foot support structure of the third seat, the divider screen, a lateral armrest of the third seat, a partition wall arranged behind the second seat, and the first foot support structure of the first seat define a continuous interconnected structure that extends between the third seat and the second seat and between the second seat and the first seat.

* * * * *